United States Patent [19]

Allen

[11] Patent Number: 4,462,443
[45] Date of Patent: Jul. 31, 1984

[54] POSITIONING AND FEEDING APPARATUS FOR LUMBER EDGER INCLUDING IMPROVED CLAMP MEANS

[75] Inventor: William H. Allen, Sherwood, Oreg.

[73] Assignee: Kockums Industries, Inc., Talladega, Ala.

[21] Appl. No.: 388,308

[22] Filed: Jun. 14, 1982

[51] Int. Cl.³ .............................................. B27B 1/00
[52] U.S. Cl. ................................... 144/242 R; 83/367; 144/242 E; 144/245 R; 144/367; 269/56; 269/71; 269/242
[58] Field of Search .................... 83/71, 364, 365, 367; 269/55, 56, 58, 71, 242; 144/242 R, 245 R, 242 E, 356, 357

[56] References Cited

U.S. PATENT DOCUMENTS

| | | | |
|---|---|---|---|
| 3,276,492 | 10/1966 | Kervefors | 83/364 |
| 3,736,968 | 6/1973 | Mason | 144/312 |
| 3,970,128 | 7/1976 | Kohlberg | 144/245 A |
| 4,097,159 | 6/1978 | Strandberg | 356/167 |
| 4,196,648 | 4/1980 | Jones et al. | 83/365 |
| 4,269,245 | 5/1981 | Fornell et al. | 144/245 A |
| 4,316,491 | 2/1982 | Kearnes et al. | 83/367 |
| 4,365,704 | 12/1982 | Stenvall | 83/367 |
| 4,383,561 | 5/1983 | Gregoire et al. | 144/357 |

FOREIGN PATENT DOCUMENTS 2706149  8/1978  Fed. Rep. of Germany ........ 83/367

Primary Examiner—W. D. Bray
Attorney, Agent, or Firm—Klarquist, Sparkman, Campbell, Leigh & Whinston

[57] ABSTRACT

An edging optimizer apparatus is described including scanner means for scanning lumber with light beams to determine a reference axis which may be the optimum yield axis for cutting boards therefrom and improved clamp means for clamping the lumber after scanning, skewing the lumber in response to the output of the scanner means until its reference axis is parallel with the cutting axis of the edger, and transferring the clamped and skewed lumber to an aligned position where its reference axis is in alignment with such cutting axis. The lumber is discharged from the clamp means at the aligned position and is fed to the edger cutting means longitudinally along the cutting axis to cut the opposite side edges of the lumber and produce boards of the proper size for optimum yield in volume or selling price. The clamp means includes a plurality of pairs of clamp members, each pair being mounted on separate guide means for sliding together to clamp the lumber between two pairs of clamps at the opposite ends thereof in a clamping position. The clamped lumber is skewed by moving the two pairs of clamps different amounts in response to positioning signals corresponding to its reference axis. The pairs of clamp members are pivoted between an extended condition above the lumber conveyor so they can clamp the lumber and a retracted condition below the conveyor so they can return beneath the lumber from the aligned position to the clamping position.

23 Claims, 12 Drawing Figures

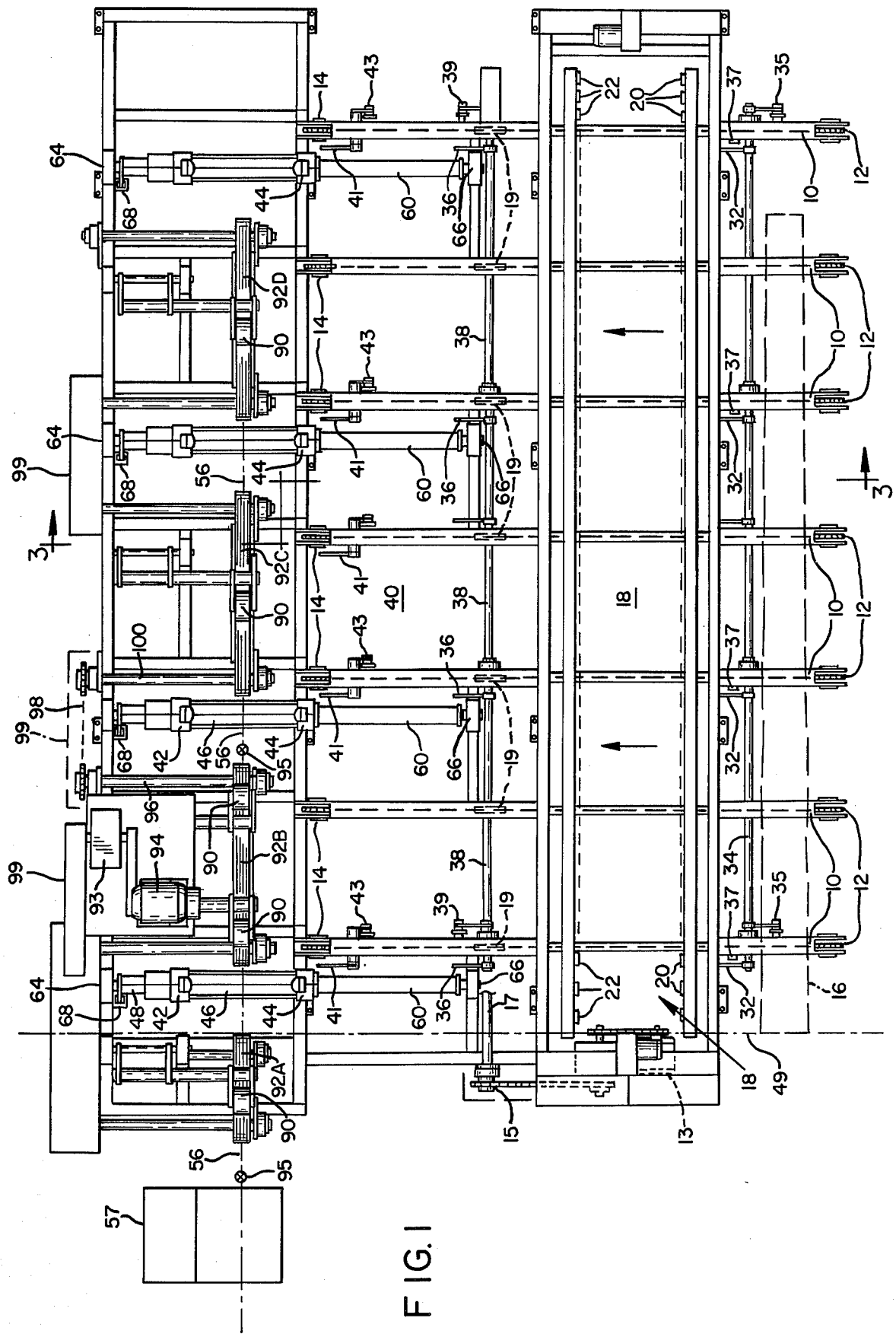

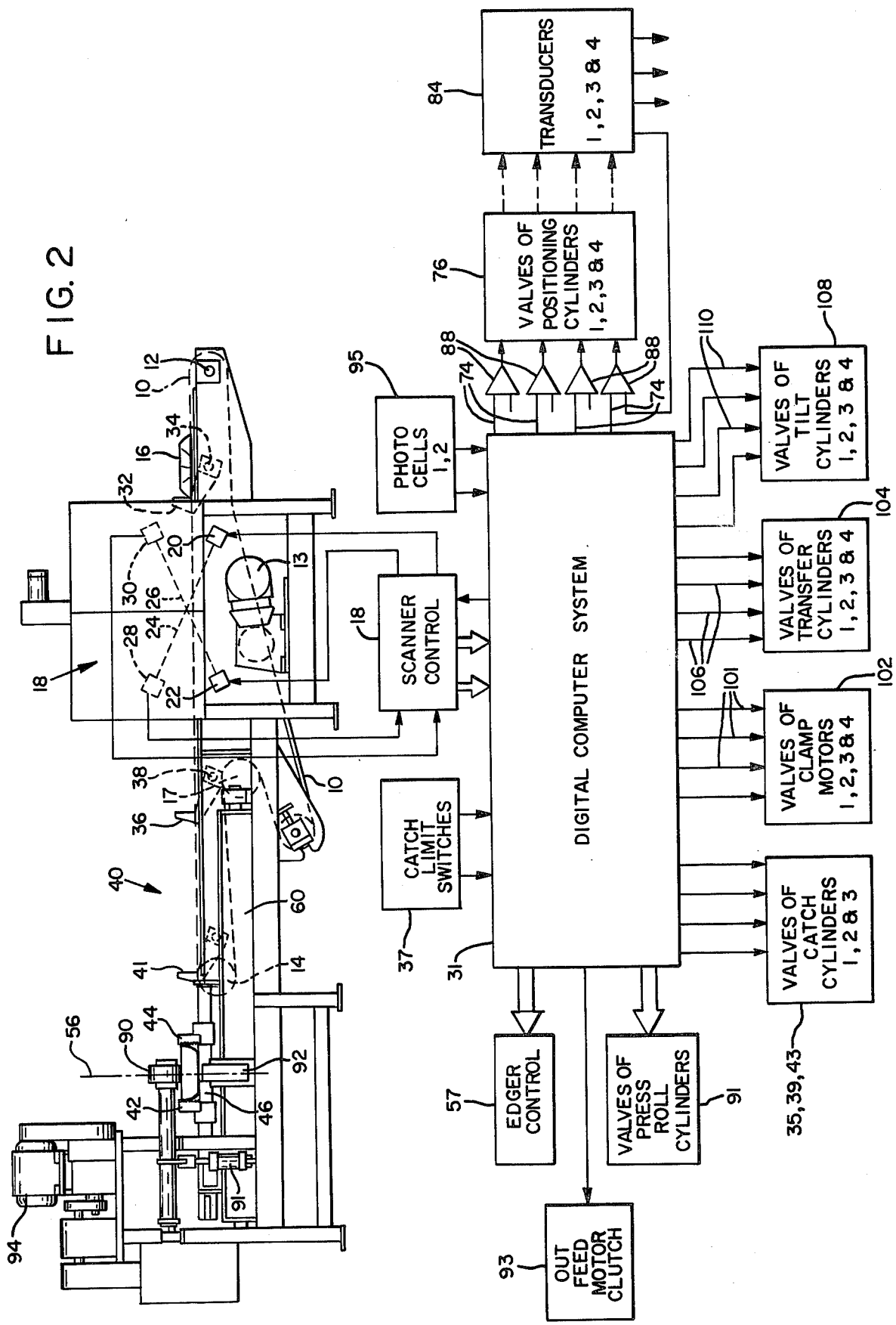

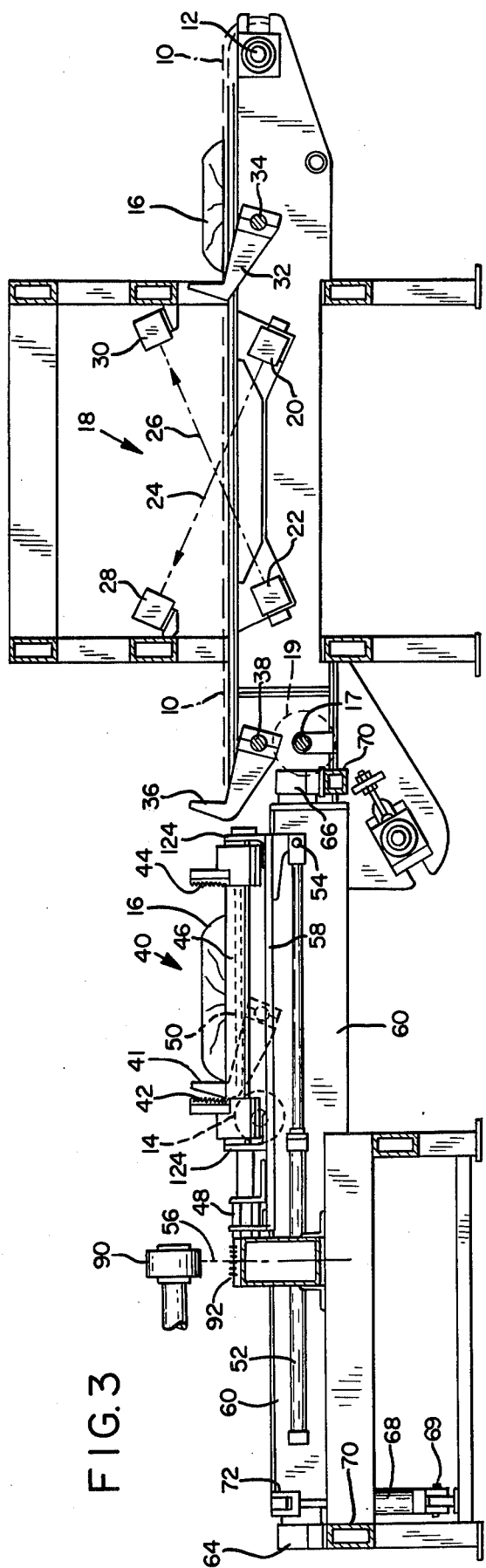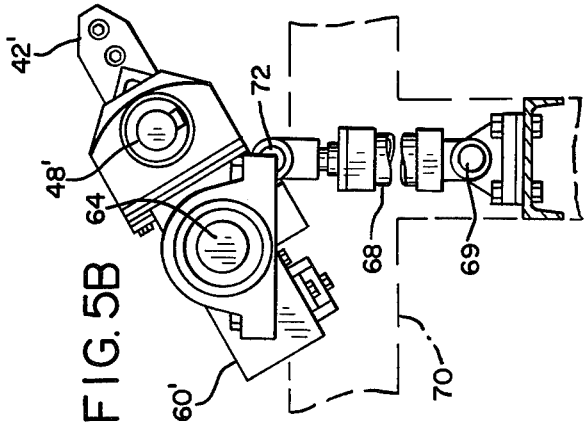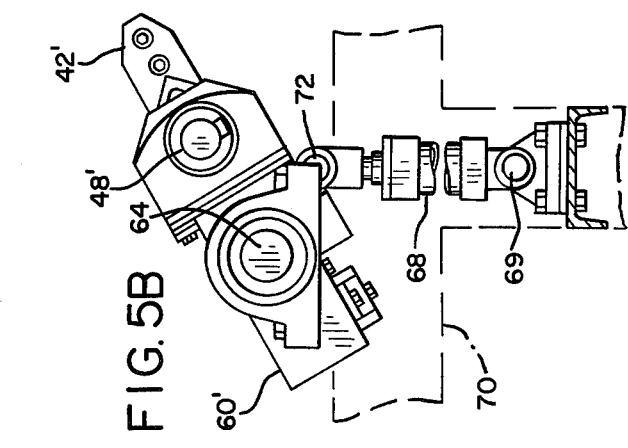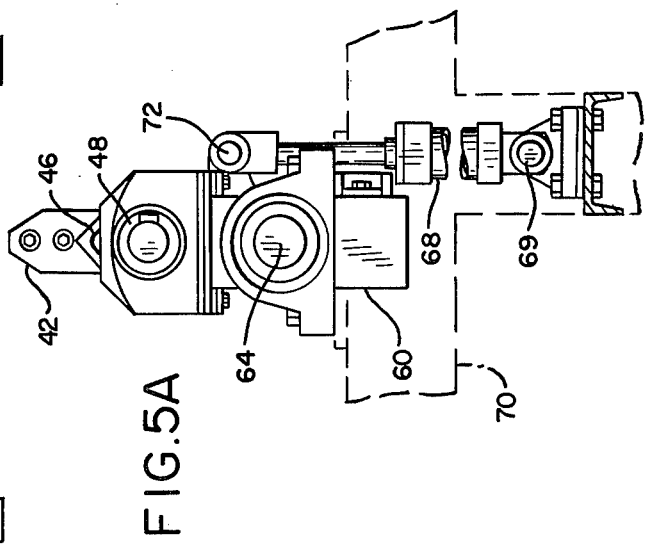

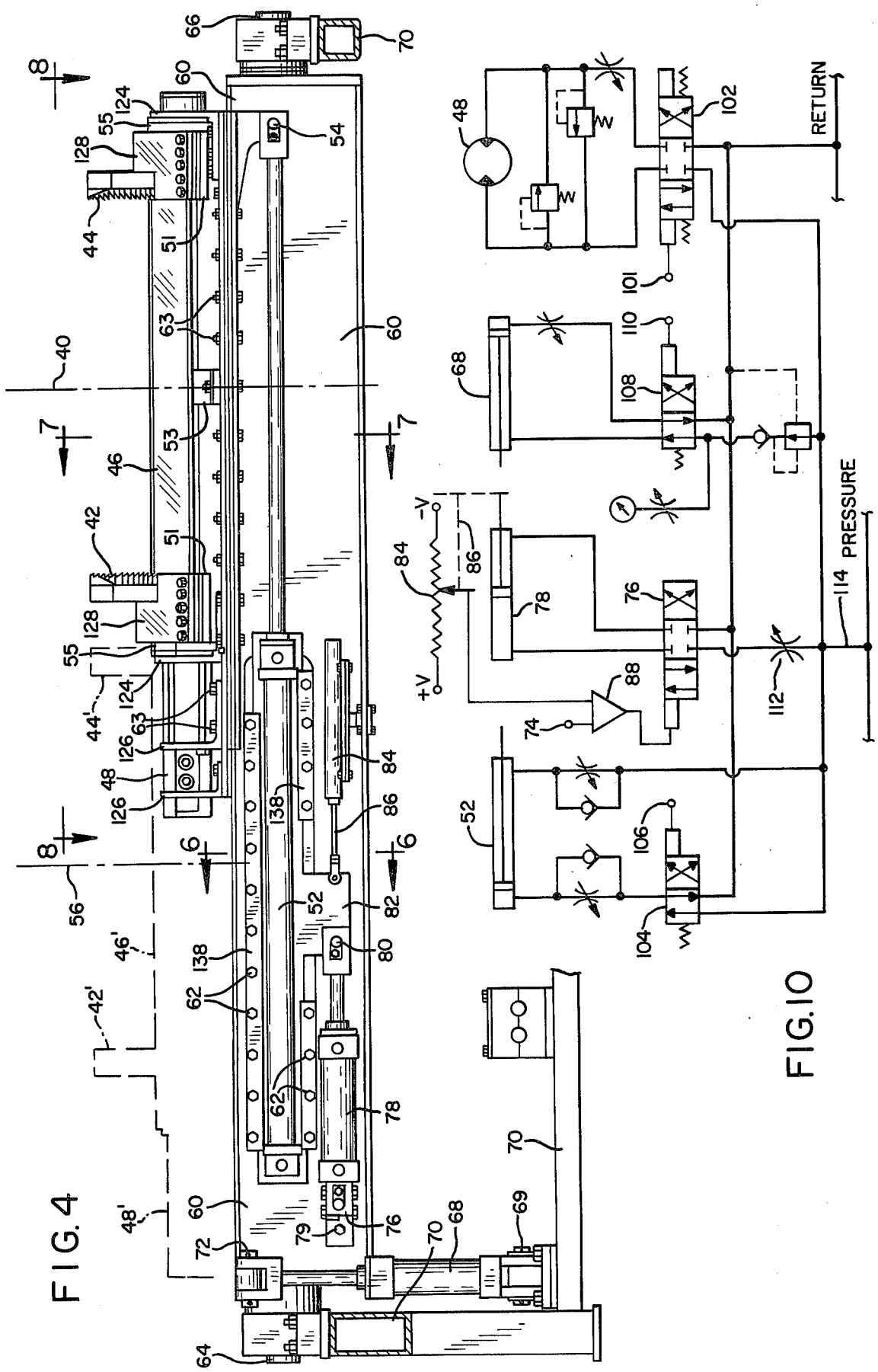

POSITIONING AND FEEDING APPARATUS FOR LUMBER EDGER INCLUDING IMPROVED CLAMP MEANS

BACKGROUND OF INVENTION

The subject matter of the present invention relates generally to lumber positioning and feeding apparatus, and in particular to such apparatus used for feeding a lumber edger including an edging optimizer which determines a reference axis which may be the optimum yield axis of the lumber and aligns such reference axis with the cutting axis of the edger to optimize the yield of boards cut from lumber.

It has been previously proposed in U.S. Pat. No. 3,736,968 of Mason issued June 5, 1973 to provide an edging optimizer in which a reference axis corresponding to the optimum yield axis of a flat piece of lumber with uncut rough edges, sometimes referred to in the industry as a "cant" or a "flitch", is determined electronically by scanning the lumber with light beams. The scanner includes a plurality of light sources and associated light detectors or photocells mounted in aligned pairs at longitudinally spaced positions along the flitch with the outputs of the photocells being connected to a data processing unit such as a digital computer which calculates the optimum yield axis. The flitch is aligned by adjustable stops on the conveyor which are controlled by the computer, with its optimum yield axis aligned with the cutting axis of the edger. U.S. Pat. No. 3,970,128 of Kohlberg issued July 20, 1976 shows a similar teaching except the flitch is stopped during scanning. A somewhat similar lumber edger apparatus employing automatic scanning with a plurality of light sources is disclosed in U.S. Pat. No. 4,196,648 of Jones et al issued Apr. 8, 1980 which shows a computer program for operating a digital computer to determine a side edge reference axis and the location of the edger saw cuts relative to the reference axis on the lumber being scanned.

An improved scanner apparatus and method for measuring the width and locating the edge of an elongated object such as a lumber plank or flitch is shown in U.S. Pat. No. 4,097,159 of Strandberg issued June 27, 1978 which may be used as the scanner in the edging optimizer apparatus of the present invention.

In addition, U.S. Pat. No. 4,269,245 of Fornell et al issued May 26, 1981 shows an optimizing edger apparatus employing automatic light beam scanning and a computer to determine the reference axis of the lumber, and which uses a plurality of adjustable slides and clamps mounted only at the alignment position. Each clamp includes two pairs of adjustable clamp members which are mounted on opposite sides of the center line or cutting axis of the edger in order to clamp the lumber fed between such clamp members and to align its reference axis with such cutting axis in response control signals from the computer. However, in none of these prior apparatus is the lumber cant or flitch clamped by the clamp means at a location remote from the alignment position immediately after scanning and skewed until its reference axis is parallel to the cutting axis of the edger before it is transferred to the aligned position, in the manner of the present invention. In addition, unlike such prior apparatus the present clamp means is pivoted between an extended condition above the conveyor where it clamps the lumber and a retracted condition where it is below the conveyor so that such clamp means can return beneath the lumber from the aligned position to the clamping position.

As a result of these differences, the edging optimizer apparatus of the present invention has several advantages over the prior apparatus including a much faster operation which is capable of feeding up to 21 boards per minute into the edger, whereas the previous apparatus only fed a maximum of 14 boards per minute maximum. This faster operation greatly increases production of the saw mill. In addition, the lumber feeding apparatus employed in the present invention has a more trouble-free operation with less jamming because of the more positive feeding action produced by clamping the boards before they are transferred from the scanner to the aligned position. Furthermore, the present pivoted clamp apparatus is simpler and less subject to jamming because it does not require conveying means for feeding the boards over the top of one of the clamp members and down into an alignment position between the clamp members as in the prior clamp apparatus. This is avoided in the present apparatus by rotating the clamp members between the entended and retracted conditions so that they can pass beneath the lumber when retracted to return from the aligned position to the clamping position and then be pivoted to an extended condition to raise the clamp members above the lumber on opposite sides of the lumber prior to clamping.

SUMMARY OF INVENTION

One object of the present invention is to provide an improved lumber positioning and feeding apparatus of fast, accurate and trouble-free operation.

Another object of the invention is to provide such an apparatus for feeding pieces of lumber to a cutting means more quickly by scanning to determine a reference axis for the lumber, clamping such lumber after scanning, skewing the lumber until its reference axis is parallel to a cutting axis and transferring the clamped and skewed lumber to an aligned position where its reference axis is aligned with the cutting axis.

A further object of the invention is to provide an edging optimizer apparatus using such positioning and feeding apparatus for faster and more efficient operation to increase the number of boards per minute which are fed to an edger cutting means.

An additional object of the invention is to provide such an appartatus with an improved clamp means which clamps the lumber immediately after the lumber is scanned to determine its optimum yield axis, and which automatically skews the lumber in accordance with the output of the scanner before the lumber is transferred to the aligned position for faster, more accurate trouble-free operation which is less subject to jamming because of more positive feeding of the lumber by clamping the lumber before it is transferred to the aligned position.

Still another object of the present invention is to provide an improved lumber feeding and positioning apparatus in which an improved clamp means is employed for clamping the lumber between a plurality of pairs of clamp members which are pivoted between an extended condition for clamping the lumber and a retracted condition to permit such clamp members to return beneath the lumber from the aligned position to the clamping position.

A still further object of the invention is to provide such a lumber positioning and feeding apparatus in which each pair of clamp members slide on a guide means and are driven by a clamp motor and lead screw drive to provide a clamp assembly which slides on a transfer track means between the clamping position and the aligned position when acuated by a transfer cylinder, and the relative positions of the two pairs of clamp members clamping the opposite ends of the lumber are adjusted laterally by their positioning cylinders to skew the lumber until its optimum yield axis is parallel to the cutting axis of the edger means during transfer to the aligned position for more accurate alignment of the lumber in a faster manner.

DESCRIPTION OF DRAWINGS

Other objects and advantages of the present invention will be apparent from the following detailed description of a preferred embodiment thereof and from the attached drawings of which:

FIG. 1 is a plan view of the top of the edger optimizer apparatus of the present invention;

FIG. 2 is a side elevation view of the left side of the apparatus of FIG. 1 and a block diagram of an electrical control system associated therewith;

FIG. 3 is an enlarged vertical section view taken along the line 3—3 of FIG. 1 showing the scanning means and the clamp means;

FIG. 4 is an enlarged front elevation view of the clamp assembly and transfer means of the apparatus of FIGS. 1-3;

FIGS. 5A and 5B are enlarged side elevational views of the left end of the apparatus of FIG. 4 taken along the line 5—5, respectively, showing the clamp assembly in its extended condition and retracted condition;

FIG. 6 is an enlarged vertical section view taken along the line 6—6 of FIG. 4 showing the transfer track and transfer cylinder for transferring the clamp assembly between the clamping position and the aligned position;

FIG. 10 is a schematic diagram of the hydraulic system and electrical circuits employed in the control means for the apparatus of FIGS. 1-9.

DESCRIPTION OF PREFERRED EMBODIMENT

Figure 8:
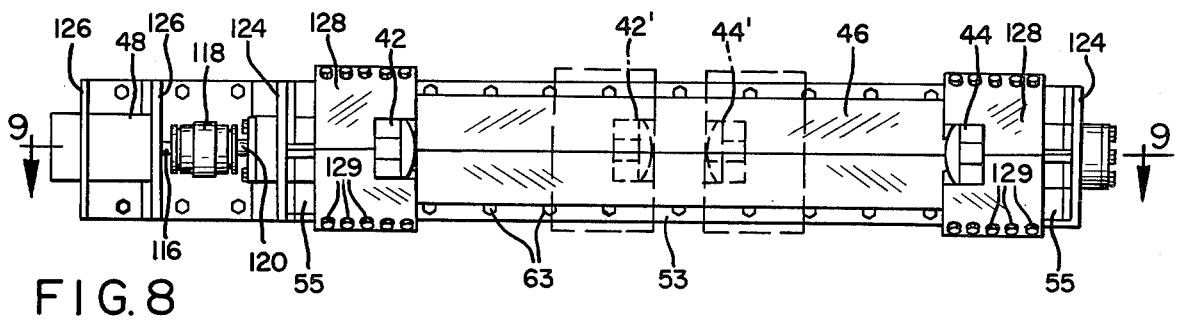
FIG. 8 is an enlarged plan view of the top of the clamp assembly taken along the horizontal line 8—8 of FIG. 4.

As shown in FIGS. 1, 2 and 3 the edging optimizer apparatus of the present invention comprises a lumber conveyor about 22 feet wide and 12 feet long including seven parallel endless conveying chains 10 each mounted for rotation about end sprockets 12 and 14 at the opposite ends thereof. The conveyor is driven by an electric motor 13 coupled to a power sprocket 15 connected to a common drive shaft 17 which rotates seven drive sprockets 19, each driving one of the conveyor chains 10. A plurality of flat pieces of lumber 16, such as unedged boards or planks called "cants" or "flitches", are conveyed laterally along such conveyor means in a conventional manner by the conveyor chains 10 and pass through an automatic light scanner means 18 for measuring the width of each flitch at a plurality of points longitudinally spaced along its length to determine a reference axis which may be the optimum yield axis of the flitch in the manner described in the above-cited patents. The scanner means 18 includes a plurality of light sources arranged in two groups of longitudinally spaced light sources 20 and 22 positioned beneath the upper reach of the conveyor chains 10 which direct light beams 24 and 26, respectively, at two groups of light detectors or photocells 28 and 30 positioned above the conveyor. The light beams 24 and 26 of each pair of light sources and photocells intersect the edge of the flitch 18 at both the leading and trailing edges thereof to determine the width of such flitch at a plurality of points longitudinally spaced along the flitch, in the manner described in the cited U.S. Pat. No. 4,097,159. This width information is transmitted to a general purpose computer system 31 including one or more digital computers which calculates the reference axis of such flitch. The light sources 20 and 22 may be infrared light sources produced by light emitting diodes, while the photocells 28 and 30 may be photo-transistors on which the light beams are focused by suitable lens systems protected within a suitable housing adjacent each light source.

A first set of catch hooks 32 attached to a common operating shaft 34 are provided at a position on the conveyor 10 in front of the scanner 18 for holding the flitches 16 and feeding them one at a time through the scanner upon rotation of the shaft by operating cylinders 35 to release the flitch. The catch cylinders 35 are actuated when a flitch is sensed by a pair or limit switches 37 laterally spaced across the conveyor 10 in front of the first catch hooks 32 and connected to the computer 31 which controls solenoid valves associated with such cylinders. A second set of catch hooks 36 mounted on a common shaft 38 is provided on the conveyor immediately after the scanner 18 to hold the flitches in an up position of the catch hooks and upon rotation of the shaft by operating cylinders 39 into a down position of such catch hooks to feed them into a clamping position 40. At the clamping position the flitches are engaged by a third set of catch hooks 41 each actuated by a separate operating cylinder 43 and are held by such hooks in their up position until they are rotated into a down position when the flitch is clamped and held between two pairs of clamp members 42 and 44 at such clamping position. Catch operating cylinders 39 and 43 are operated by associated solenoid valves at times controlled by the computer 31.

As shown in FIGS. 3 and 4, four pairs of clamp members 42 and 44 are each mounted on a separate clamp guide 46 for sliding movement along such guide in response to the actuation of a hydraulic clamp motor 48 to form four clamp assemblies. As shown in FIG. 1 the four clamp assemblies are uniformly spaced laterally across the conveyor 10 at four positions of about 1 foot, 7 feet, 13 feet and 19 feet from a reference stop line 49 to enable the processing of lumber in the length range of 8 feet to 20 feet long and up to 24 inches wide. The ouput shaft of the clamp motor 48 is coupled to a lead screw 50 which is threadedly connected to a pair of nuts 51 each attached to one of the clamp members 42 and 44. Rotation of the lead screw in one direction causes the nuts 51 to travel along such screw toward each other thereby moving the clamp members together to clamp the flitch. Rotation of the lead screw in the opposite direction causes the nuts to move such clamp members away from each other to unclamp the flitch. A center stop 53 and two end stops 55 of elastomer material such as polyurethane are provided on the guide 46 to limit the travel of the clamp members, as shown in FIG. 4. After clamping the flitch between two pairs of clamp members 42 and 44 adjacent the opposite ends thereof in the clamping position 40, the associated two clamp assemblies are each transferred to an aligned position 56 by a different transfer cylinder 52 whose piston rod is attached at a connecting point 54 to the bottom of such clamp assembly, as shown in FIG. 3. The aligned position corresponds to the cutting axis 56 of an edger cutting means 57. In this aligned position the optimum yield axis or other reference axis of the flitch is aligned with the cutting axis 56.

As shown in FIG. 4, each clamp assembly including the pair clamp members 42 and 44, the clamp guide 46 and the motor 48, is carried on a transfer slide plate 58 which slides along a transfer track member 60 to move the clamp assembly from the clamping position 40 to the aligned position 56. The transfer cylinder 52 is attached by bolts 62 to a support member on transfer track member 60, and the clamp assembly is bolted to slide plate 58 by bolts 63, such slide plate and clamp assembly being mounted on the transfer track member 60 for pivoting with such track member about tilt bearings 64 and 66 at the opposite ends thereof. Thus, the entire transfer track and clamp assembly is pivoted by a tilt cylinder 68 about the tilt bearings between the extended and retracted conditions shown in FIGS. 5A and 5B. When the clamp members 42 and 44 are pivoted to the extended condition in FIG. 5A, such clamp members extend above the conveyor 10 so they can engage the lumber flitch 16 in the clamping position 40. However, in the retracted condition of FIG. 5B the clamp members 42 and 44 are retracted below the top of the conveyor 10 so that such clamp members can pass beneath the next flitch held by catch hooks 41 on such conveyor, when the clamp assembly returns from the aligned position 56 to the clamping position 40 after discharging the previous flitch. The tilt cylinder 68 is attached by a connection 69 at one end to a stationary frame 70 and its piston rod is secured at a connection 72 to the transfer track member 60 to tilt the transfer track member and the clamp assembly between the extended and retracted conditions of FIGS. 5A and 5B.

During transfer of the flitch 16 from the clamping position 40 to the aligned position 56, such flitch is skewed to align its optimum yield axis with the cutting axis 56. This is accomplished by displacing the two different pairs of clamp members which engage the opposite ends of the flitch by different amounts in a lateral direction in accordance with positioning signals produced at the corresponding two outputs of four positioning outputs 74 of the computer 31. Each positioning signal is fed to a solenoid actuated servo valve 76 controlling a different positioning cylinder 78 for each of the four clamp assemblies to adjust the alignment position of each clamp pair 42 and 44. The positioning cylinder 78 has one end attached at connection 79 to the transfer track member 60 and has its piston rod attached at connection 80 to a sliding support member 82 on which the transfer cylinder 52 is mounted for sliding movement relative to the track member 60 as shown in FIGS. 4 and 6. As a result, the clamp assembly which is attached at 54 to the piston rod of the transfer cylinder 52 is also moved along with the transfer cylinder for skewing in response to adjustments in the setting of the positioning cylinder 88. This changes the relative lateral positions of the two pairs of clamp members 42 and 44 which clamp the flitch 16 to skew the flitch until the optimum yield axis of the flitch is substantially parallel to the cutting axis 56 either before clamping or during transfer from the clamping position 40 to the alignment position.

A transducer device 84 having its movable actuator 86 connected to the slide plate 82, is provided to indicate the position of the positioning cylinder piston, the slide and the associated pair of clamp members by transmitting a corresponding electrical signal to a servo amplifier 88 controlling the solenoid actuated servo valve 76, as shown in FIGS. 4 and 10. The transducer 84 may be a variable resistance potentiometer connected between two D.C. voltage sources of different voltage whose movable contact 86 is connected to one input of the servo amplifier 88 which may be a comparator or differential amplifier whose other input is connected to one of the positioning signal outputs 74 of the computer 31. The output of the differential amplifier 88 is connected to the solenoid valve 76, which is a three-position spool valve for moving the piston of the positioning cylinder 78 in opposite directions in the two end positions of such valve, and holding such piston in a balanced condition in the middle position of the valve due to negative feedback. Thus, the transducer 84 provides a negative feedback signal for the servo system which eventually produces a zero voltage output at the output of the differential amplifier 88 when the voltage on the transducer contact 86 equals the positioning voltage at computer output 74 so that the solenoid valve 76 is held in the balanced middle position shown in FIG. 10. This servo control causes skewing of the flitch by movement of the clamp assemblies into the balanced position of the positioning cylinder 78 so that the optimum yield axis of the lumber flitch is aligned with the cutting axis 56 after transfer of the flitch to the aligned position.

As shown in FIG. 2, when the clamped flitch 16 is moved into the aligned position with its optimum yield axis in alignment with the cutting axis 56 of the edger cutting means 57, a plurality of pressure hold down rolls 90 are pivoted down into engagement with the top surface of the flitch by hold down cylinders 91 and associated solenoid valves. The hold down rolls hold such flitch down into contact with the upper surface of one or more of four axially aligned conveyor chains 92 of an outfeed conveyor. The second conveyor chain 92B is connected through a clutch 93 to the output shaft of an electrical motor 94 which drives such conveyor chain and the other conveyor chains coupled thereto at a high speed which the clutch is operated to move the flitch along the cutting axis 56 into the edger 57. A pair of photocells 95 and associated light sources are spaced along the outfeed conveyor 92 at its output and between the first an second clamps to sense when the flitch has been fed to the edger 57 and signal the computer 31 that such conveyor is free to receive the next flitch so catch 41 can be released. The edger may include three or more saws and chipper heads which cut off the opposite edges of the flitch and sometimes simuntaneously make a third cut through the middle of the flitch at positions adjusted by the computer 31 when such flitch is to be divided into two or more boards of the proper size for optimum yield either in amount of board feet or in sales price. The shaft 96 of the second outfeed conveyor chain 92A is coupled by a connecting chain 98 in housing 99 to the shaft 100 of the third outfeed conveyor chain 92C upstream from the first conveyor. In a similar manner, the first and fourth conveyor chains 92A and 92D are coupled to chains 92B and 92C, respectively, so that they too are driven by the same electric motor 94. The outfeed conveyor chains each have a rough surface for engagement with the bottom of the flitch to provide sufficient friction to move the flitch into the edger 57 while maintaining alignment of the optimum yield axis with the cutting axis 56.

After unclamping the flitch to discharge such flitch onto the outfeed conveyor 92, the clamp members 42 and 44 of each clamp assembly are pivoted downward into the retracted position shown in FIG. 5B. The clamp assembly is then returned by transfer cylinder 52 beneath the next flitch waiting in contact with the third catch 41 from the aligned position 56 to the clamping position 40. Upon reaching the clamping position 40, the clamp assembly is pivoted up into the extended position shown in FIG. 5A so that the clamp members 42 and 44 extend above the conveyor chain 10 on opposite sides of the next flitch. The clamp members 42 and 44 are then moved together into clamping engagement with the flitch by actuation of the hydraulic clamping motor 48 with one of four clamping signal outputs 101 of the computer 31.

The clamping signal output 101 is applied to a solenoid valve 102 causing the hydraulic clamp motor to rotate the lead screw 50 in a direction to close the clamp members, as shown in FIG. 10. The solenoid valve 102 controlling the clamp motor 48 may be a three-position spool valve similar to solenoid valve 76, which is shown in its balanced middle position after the lumber flitch has been clamped between the clamp members 42 and 44 operated by such motor. In this clamped condition the flitch is transferred from the clamping position 40 to the aligned position 56 where it is unclamped. To initiate unclamping, the valve 102 is moved to one of its two end positions to retract the clamp members away from the flitch, while for initial clamping the valve is moved into the opposite end position for causing such clamp members to move together by the same amount so the clamp is self-centering.

The transfer cylinder 52 is also operated with a solenoid valve 104 which is a two-position valve for moving the transfer cylinder in opposite directions to transfer the clamp assembly between the clamping position 40 and the aligned position 56. The transfer control valve 104 is actuated by one of four transfer signal outputs 106 of the computer 31 which controls the timing of the transfer. Similarly, the tilt cylinder 68 is also controlled by a two-position solenoid valve 108 which pivots the clamp assembly between the extended and the retracted conditions shown in FIGS. 5A and 5B. The timing of the operation of each tilt cylinder 56 is controlled by one of four tilt signal outputs 110 of the computer which is applied to the solenoid valve 108.

It should be noted that an adjustable flow control valve 112 is connected in series between a fluid pressure supply line 114 and the positioning cylinder control valve 76 to regulate the speed of operation of the positioning cylinder 78. Similarly, other flow control valves are provided in the pressure branch lines of the transfer cylinder 52, the tilt cylinder 68 and the clamp motor 48 in series with the main supply line 114.

Figure 9:
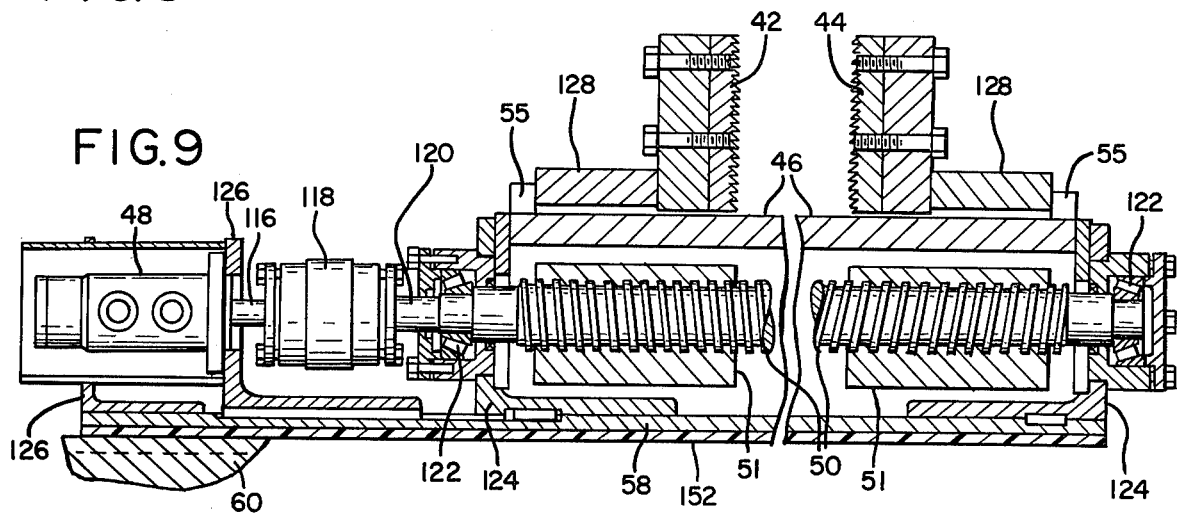
FIG. 9 is a horizontal section view taken along the line 9—9 of FIG. 8 showing the clamp motor drive.

As shown in FIGS. 8 and 9, the clamp motor 48 has its output shaft 116 connected by a coupling 118 to the shaft 120 of the lead screw 50 for rotation of such lead screw. The lead screw shaft 120 is mounted in tapered roller bearings 122 at the opposite ends thereof, and such bearings and the lead screw shaft are supported by a pair of lead screw brackets 124 attached at the opposite ends thereof to the transfer slide plate 58 by bolts 63. In a similar manner, the motor 48 is attached to a pair of motor support brackets 126 which are bolted to slide plate 58 for movement with such slide plate. Each lead screw nut 51 which may be made of bronze or other non-corrosive heat-conducting metal, is bolted to a clamp support member 128 by bolts 129 which supports the clamp member 42 or 44 and slides along the guide 46 as the nut travels.

Figure 7:
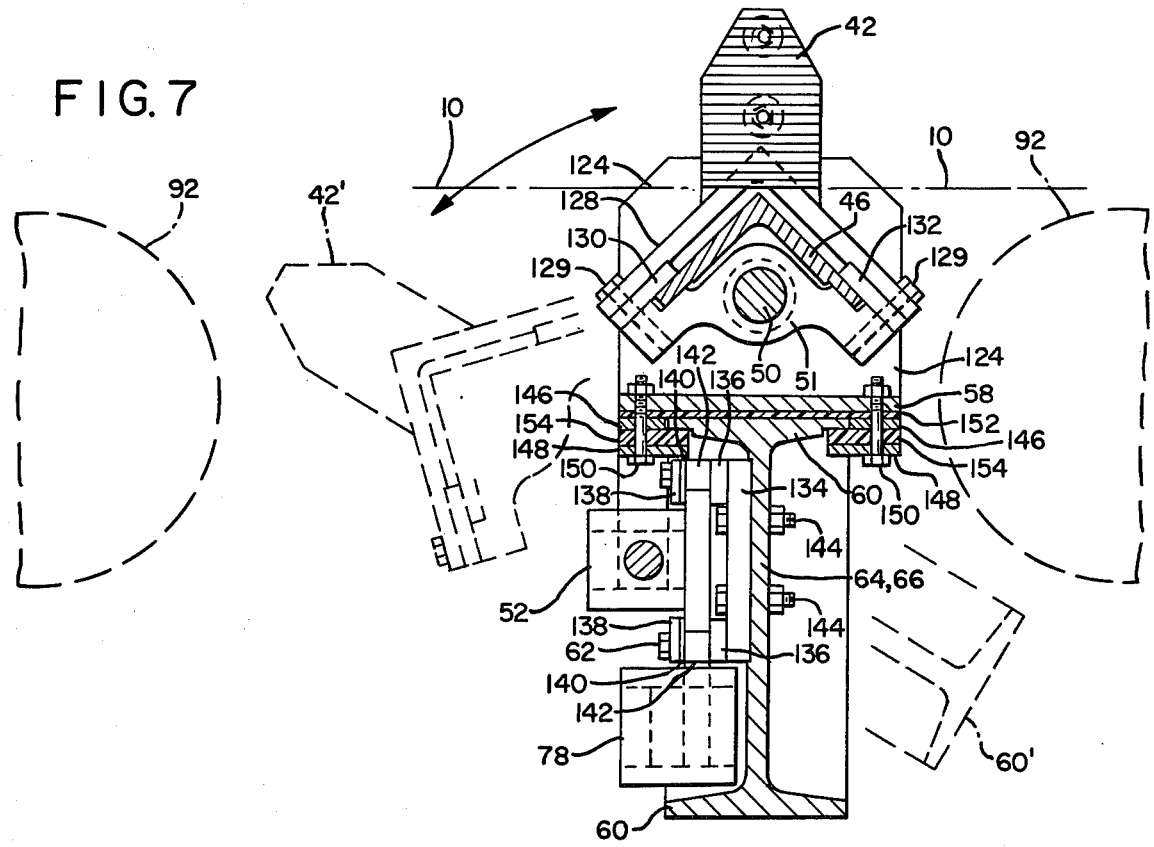
FIG. 7 is an enlarged vertical section view taken along the line 7—7 of FIG. 4 showing the guide means of the clamp assembly and the transfer track means on which said assembly is mounted.

As shown in FIG. 7, each clamp support 128 is of an inverted V-shaped cross-section and the guide 46 is of a similar cross-section shape. The clamp support 128 has a pair of bearing strips 130 and 132 of low friction synthetic plastic material, such as nylon or high density polyethylene, secured by bolts 129 between the nut 51 and the lower surfaces of the two legs of the clamp support. Thus, the bearing strips are held by bolts 129 in position to engage the upper surface of the guide member 46 to enable sliding movement on such guide. In a similar manner, the slide member 82 on which the transfer cylinder 52 is mounted is spaced from a slide support plate 134 by a pair of first bearing strip 136 of low friction synthetic plastic material, attached to such support plate to enable sliding movexent. A pair of metal gib members 138 on opposite sides of the transfer cylinder 32 are bolted to the slide support plate 134 by bolts 62 as shown in FIG. 6 and are each spaced from the slide member 82 by a second bearing strip 140 of low friction plastic material to enable sliding movement while securing such slide member to the transfer track member 60 through the slide support 134 bolted thereto by bolts 144. A third pair of bearing strips 142 are provided as spacer strips between strips 136 and 140 on opposite sides of the slide member 82 and are held by bolts 62 extending therethrough to complete the slide track. As shown in FIG. 7, the transfer track member 60 pivots about the axis of bearings 64 and 66 to tilt the clamp assembly between the extended position 42 and the retracted position 42' corresponding to FIGS. 5A and 5B, respectively.

The transfer slide plate 58 to which the clamp assembly is attached by lead screw support brackets 124 and motor brackets 126 is slidingly mounted on the transfer track member 60 by two pairs of gib plates 146 and 148, and bolts 150. A bearing plate 152 of low friction synthetic plastic material is attached between the first pair of gibs 146 and the transfer bottom of the slide plate 58 so that it moves with such slide plate in contact with the upper surface of the top flange of an I-beam forming the transfer track member 60. A pair of second bearing strips 154 of low friction plastic material is provided between the first gib 146 and the second gib 148 so that such second bearing strip engages the bottom surfaces of the opposite sides of the top flange portion of the transfer track I-beam 60. As a result, the transfer slide member 58 and the clamp assembly mounted thereon slide along the transfer track member 60 and are held on such track member during transfer of the clamp members from the clamping position 40 to the alignment position 56.

Figure 11:
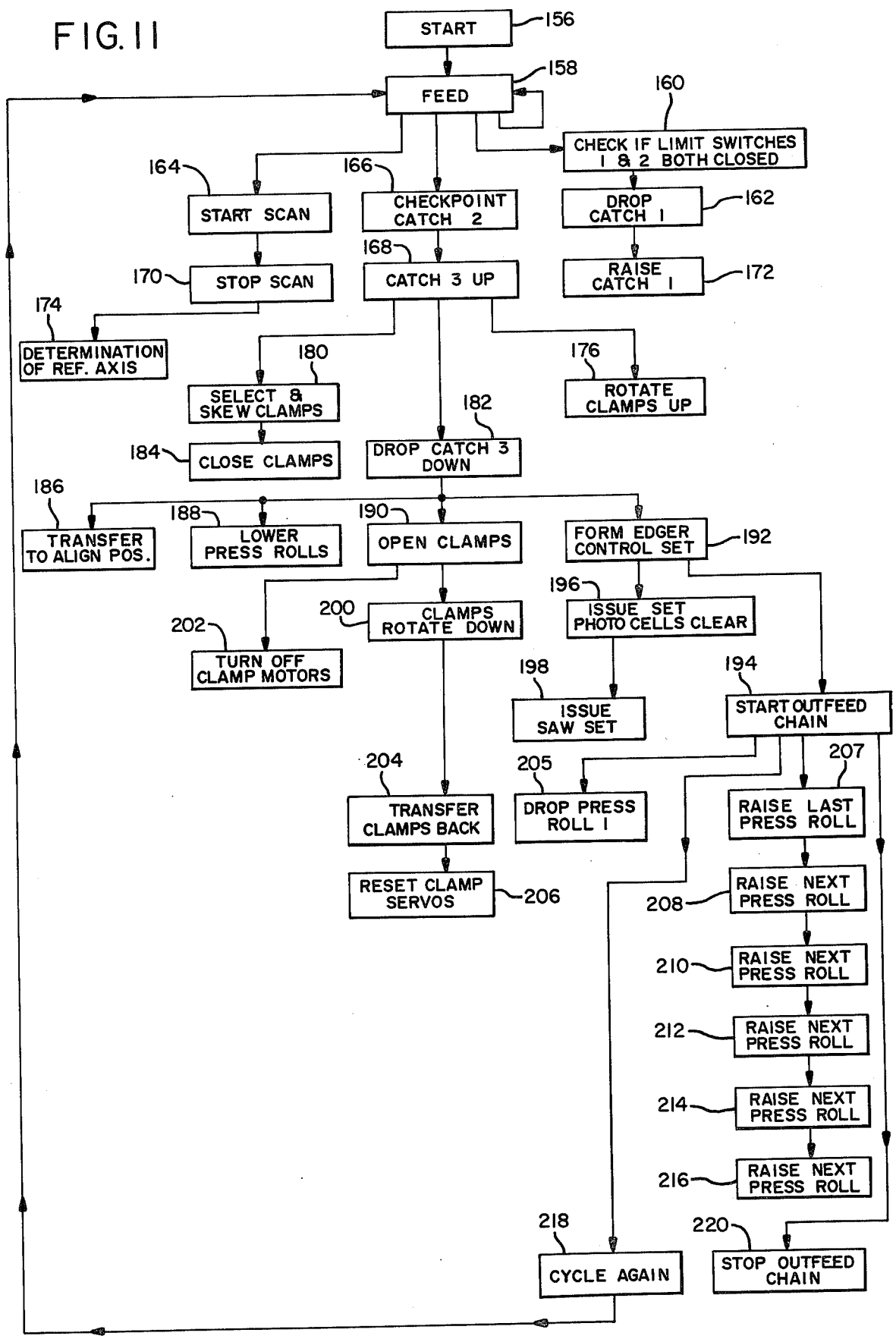
FIG. 11 is a computer operation step diagram for the computer control system of FIG. 2.

As shown in FIG. 11 the computer system 31 contains a stored computer program which performs the operating steps shown, such steps being in timed sequence corresponding to vertical distance down from a start step 156. The start step begins a feeding step 156 which causes flitches or other pieces of lumber to be fed over the conveyor 10. Next, the computer checks in step 160 to see if both the limit switches 37 are closed and if this condition exists, drops the first catch 32 into the down position in step 162. This cauess the conveyor to transmit the flitch through the scanner 18 for scanning to determine its optimum yield axis. The computer then starts the scanning operation in step 164 by pulsing the light sources on and off one at a time to produce a sequence of width measurement signals in the light detectors 28 and 30 as the flitch is conveyed through the scanner.

Next, the computer system 31 executes a checkpoint step 166 which checks the condition of the second catch 36 to see if such catch is up or down. If the second catch is down it is moved to an up position. If the second catch is up, it holds the flitch until the third catch 41 is moved to an up position in step 168 and then the computer causes the second catch to drop down and transfer the flitch to the third catch. At this time, the scanning operation is stopped by the computer in stop scan step 170, and the first catch is moved back to a raised position by the computer in step 172. After scanning is stopped in step 170 the computer then calculates the reference axis which may be the optimum yield axis of the flitch in step 74. When the reference axis is determined the computer rotates the pairs of clamps 42 and 44 up in step 176. The computer in step 180 selects which two pairs of clamps are to be used to clamp the flitch at its opposite ends and at the same time skews the position of the selected two pairs of clamps relative to each other so that the reference axis of the flitch will be parallel to the cutting axis. Then the third catch 36 is dropped down by step 182 and the selected clamps are closed on the flitch in step 184 by the computer. It should be noted that in some cases it is desirable to close the clamps on the flitch before skewing the clamps relative to each other to align the reference axis of the flitch substantially parallel to the cutting axis. However, to speed up operation the two selected pairs of clamps are perferably skewed during return from the aligned position to the clamping position before each pair of clamps closes into engagement with the flitch.

Next, in the sequence of computer controlled operating steps shown in FIG. 11, the clamped flitch is transferred by step 186 from the clamping position to the aligned position to align the optimum yield axis of the flitch with the cutting axis 56. Then the computer executes step 188 which causes the hold down or press rolls 90 to be lowered into contact with the flitch, except for the first press roll at the output of the outfeed conveyor which remains up. After this the clamps are opened in step 190 to release the flitch. Also, the computer in step 192 transmits to the edger 57 a form edger set control signal which enables the edger to cut the flitch relative to the cutting axis for optimum yield. Next, the computer executes a start outfeed chain step 194 to operate the clutch 93 thereby starting the outfeed conveyor 92 to feed the flitch through the edger. However, the outfeed chain starting step 194 is not executed until after the computer checks the status of the pair of photocells 95 detecting the flitch on the outfeed conveyor to determine if both of these photocells are clear in step 196. If the photocells show the flitch is clear, an issue saw set step 198 is executed thereby setting the positions of the saws and/or chippers relative to the cutting axis 56 for optimum yield in cutting the next flitch to be transmitted to the edger.

The computer rotates the clamps down into the retracted position in step 200 after opening the clamps to discharge the flitch onto the outfeed conveyor in step 190. Next, the computer turns off the clamp motors in step 202. Then in step 204 the clamps are transferred back from the aligned position to the clamping position in a retracted condition so that they pass beneath the next flitch held by the third catch, at the same time the first press roll closest to the edger 57 is dropped down into contact with the flitch in step 205. After transfer back the computer resets each clamp positioning cylinder 78 and servo amplifier 88 to zero in step 206.

After the flitch has been transmitted from the outfeed conveyor through the edger, the computer raises the press or hold down rolls 90 one at a time in a series of steps 207, 208, 210, 212, 214 and 216, beginning with the last pressed roll upstream from the edger and preceding downstream toward the edger until all press rolls are in a raised position. Then the computer executes the cycle again command 218 which causes the cycle to start over again beginning with the feed step 158 for processing the next flitch in the same manner as described above. Finally, the computer executes the stop outfeed chain command 220 which causes the conveyor clutch 93 to disengage thereby stopping the outfeed conveyor chain.

It will be obvious to those having ordinary skill in the art that many changes may be made in the preferred embodiment of the invention. Therefore, the scope of the invention should be determined by the following claims.

I claim:

1. Edging optimizer apparatus, comprising:
    conveyor means for conveying pieces of lumber along a path to an edger cutting means having a cutting axis;
    scanner means for automatically scanning each piece of lumber in said path to determine a reference axis for cutting boards therefrom and to produce an output signal corresponding thereto;
    clamp means for clamping the lumber in a clamping position, skewing the lumber in response to the output of said scanner means until its reference axis is parallel to said cutting axis, and moving the clamped and skewed lumber to an aligned position where its reference axis is in alignment with the cutting axis of said edger means, said clamp means releasing the lumber and returning from the aligned position to the clamping position along a return path beneath the lumber supported on the conveyor means; and
    feeder means for feeding said lumber from its aligned position after release by said clamp means to said edger means longitudianlly along said cutting axis.

2. Apparatus in accordance with claim 1 in which said clamp means includes a plurality of pairs of clamp member which are connected so that two of said pairs clamp the lumber between said clamp members, each pair of clamp members being pivotally mounted to pivot between an extended position above the conveyor means for clamping said lumber and a retracted position below the conveyor means to enable said clamp members to move beneath the lumber when returning from the aligned position to the clamping position.

3. Apparatus in accordance with claim 1 in which two pairs of clamp members clamping the piece of lumber are spaced apart longitudinally adjacent the opposite ends of the lumber, and the clamp means adjusts the relative lateral positions of said two pairs of clamp members to skew the clamped lumber before said pairs of clamp members are transferred to said aligned position.

4. Apparatus in accordance with claim 2 in which the feeder means includes pressure roller means for engaging the lumber in said aligned position after which the clamp members are moved apart to unclamp the lumber and the clamp members are then pivoted to said retracted position.

5. Apparatus in accordance with claim 2 in which each pair of clamp members is mounted on a guide means for guiding the clamping movement of the clamp members and is connected to a clamp motive means for moving said clamp members to clamp and unclamp said lumber.

6. Apparatus in accordance with claim 5 in which each pair of clamp members is mounted on a guide means and connected to one clamp motive means forms a clamp assembly which is moved on a transfer track means between said clamping position and said aligned position by a transfer means separate from the clamp motive means.

7. Apparatus in accordance with claim 6 in which the transfer means is a transfer cylinder and the clamp motive means is a lead screw and associated motor.

8. Apparatus in accordance with claim 6 in which the clamp means includes a pivot means for pivoting the clamp members.

9. Apparatus in accordance with claim 8 in which the pivot means includes a tilt cylinder for pivoting said clamp members between said retracted position and said extended position.

10. Apparatus in accordance with claim 9 in which the tilt cylinder pivots the track means on which the clamp means is mounted for sliding between said clamping position and said aligned position, said track means being pivotally mounted on bearing means at the opposite ends thereof.

11. Apparatus in accordance with claim 6 in which the clamp means including a skewing motive means for moving the transfer means, and the clamp assembly in response to the output of said scanner means.

12. Apparatus in accordance with claim 11 in which the skewing motive means is a positioning cylinder and the transfer means is a transfer cylinder.

13. Apparatus in accordance with claim 1 in which the scanner means includes a plurality of light sources and associated light detectors spaced longitudinally along the length of the piece of lumber and means for determining the optimum yield axis of the lumber from the electrical output signals of the light detectors and for applying an optimum yield axis signal to said clamp means.

14. Lumber feeding apparatus, comprising:
   clamp means for clamping a piece of lumber between a plurality of pairs of clamp members in a clamping position;
   transfer means for moving said clamp members and the clamped lumber laterally from said clamping position to a discharge position;
   pivot means for pivoting said clamp members between an extended condition for clamping said lumber and a retracted condition below said lumber in said clamping position; and
   automatic control means for controlling said clamp means, said transfer means and said pivot means to cause said clamp means to unclamp said lumber in said discharge position, said pivot means to pivot said clamp members from said extended condition to said retracted condition at said discharge position to discharge the lumber, and said transfer means to move said clamp members beneath the lumber in said retracted condition from said discharge position to said clamping position.

15. Apparatus in accordance with claim 14 in which two pairs of clamp members clamp each piece of lumber adjacent the opposite ends thereof.

16. Apparatus in accordance with claim 14 in which the control means adjusts the relative lateral positions of the clamp members to skew the clamped lumber before said clamp members are moved to said discharge position.

17. Apparatus in accordance with claim 14 in which the clamp means includes clamp motive means for moving each pairs of clamp members toward and away from each other to clamp and unclamp said lumber.

18. Apparatus in accordance with claim 17 in which each pair of clamp members is mounted on a guide means for guiding their clamping movement.

19. Apparatus in accordance with claim 18 in which the guide means includes a guide track member of an inverted V-shaped cross-section and a pair of similarly shaped slide members supported on said guide track member for sliding movement along bearing surfaces, said slide members having said clamp members attached thereto.

20. Apparatus in accordance with claim 19 in which the bearing surface of said slide member is coated with a layer of low friction synthetic plastic.

21. Apparatus in accordance with claim 19 in which each slide member is connected to a lead screw nut member mounted on a lead screw extending longitudinally beneath said guide track member, said lead screw being coupled to a motor in said clamp motive means for rotating said lead screw to move said nut and said slide member along said guide track member for clamping and unclamping said clamp members.

22. Apparatus in accordance with claim 18 in which a clamp assembly formed by one pair of clamp members, a clamp motive means and a guide means, is mounted on a transfer track means for movement of said clamp assembly between said clamping position and said discharge position in response to actuation of a transfer cylinder in said transfer means.

23. Apparatus in accordance with claim 22 in which the transfer track means is pivoted by a tilt cylinder in said pivot means to tilt said clamp members between said extended condition and said retracted condition.

* * * * *